United States Patent
Atsmon et al.

(10) Patent No.: US 9,607,327 B2
(45) Date of Patent: Mar. 28, 2017

(54) OBJECT SEARCH AND NAVIGATION METHOD AND SYSTEM

(76) Inventors: Dan Atsmon, Rehovot (IL); Alon Atsmon, Tel Aviv (IL)

( * ) Notice: Subject to any disclaimer, the term of this patent is extended or adjusted under 35 U.S.C. 154(b) by 1189 days.

(21) Appl. No.: 12/499,118

(22) Filed: Jul. 8, 2009

(65) Prior Publication Data

US 2010/0064254 A1   Mar. 11, 2010

Related U.S. Application Data

(60) Provisional application No. 61/078,789, filed on Jul. 8, 2008.

(51) Int. Cl.
| | |
|---|---|
| G06Q 30/06 | (2012.01) |
| G06F 3/0482 | (2013.01) |
| G06F 3/0481 | (2013.01) |
| G06F 3/0484 | (2013.01) |
| G06F 17/30 | (2006.01) |

(52) U.S. Cl.
CPC ....... *G06Q 30/0603* (2013.01); *G06F 3/0482* (2013.01); *G06F 3/04817* (2013.01); *G06F 3/04842* (2013.01); *G06F 17/30247* (2013.01)

(58) Field of Classification Search
CPC .... G06F 3/048; G06F 3/0482; G06F 3/04817; G06F 3/04842
USPC ................................................. 715/810, 838
See application file for complete search history.

(56) References Cited

U.S. PATENT DOCUMENTS

| | | | | |
|---|---|---|---|---|
| 5,802,361 A * | 9/1998 | Wang et al. | ................... | 382/217 |
| 5,915,250 A * | 6/1999 | Jain et al. | | |
| 6,182,069 B1 * | 1/2001 | Niblack et al. | | |
| 6,269,358 B1 * | 7/2001 | Hirata | | |
| 6,847,980 B1 * | 1/2005 | Benitez et al. | ................ | 707/741 |
| 7,716,157 B1 * | 5/2010 | Bourdev et al. | | |
| 7,903,125 B1 * | 3/2011 | Ayers et al. | ................... | 345/629 |
| 7,996,341 B1 * | 8/2011 | Kueck | .............. | 706/12 |
| 2003/0195883 A1 * | 10/2003 | Mojsilovic et al. | .............. | 707/6 |
| 2003/0210808 A1 * | 11/2003 | Chen et al. | .................... | 382/118 |
| 2004/0093321 A1 * | 5/2004 | Roustant et al. | ................. | 707/3 |
| 2004/0143598 A1 * | 7/2004 | Drucker et al. | ........... | 707/104.1 |
| 2005/0044100 A1 * | 2/2005 | Hooper et al. | ................ | 707/102 |
| 2005/0162523 A1 * | 7/2005 | Darrell et al. | ............. | 348/211.2 |
| 2005/0203918 A1 * | 9/2005 | Holbrook | ........................ | 707/10 |
| 2005/0265635 A1 * | 12/2005 | Brechner | ...................... | 382/305 |

(Continued)

OTHER PUBLICATIONS

Office Action Dated Nov. 26, 2012 From the Israel Patent Office Re. Application No. 199762 and its Translation Into English.†

*Primary Examiner* — Tuyetlein T Tran

(57) ABSTRACT

A computer implemented method of presenting visual content items, comprising: grouping the visual content items according to predefined similarity rules relating to visual characteristics of the visual content items such that each group has a range for the number of its members; selecting a representative visual content item for each group; presenting the representative visual content item of each group that has a minimal number of members above a predefined threshold; and optionally presenting the visual content items alongside the representative visual content items. The grouping may be carried out by using predefined color groups; by using predefined shape groups; or using Keypoints of the visual content items, and relate to groups of human faces, product images and landscape images.

25 Claims, 16 Drawing Sheets

(56) References Cited

U.S. PATENT DOCUMENTS

| | | | |
|---|---|---|---|
| 2006/0050934 A1* | 3/2006 | Asai | 382/118 |
| 2006/0129914 A1* | 6/2006 | Ellis et al. | 715/504 |
| 2007/0036371 A1* | 2/2007 | Buil et al. | 381/312 |
| 2007/0219964 A1* | 9/2007 | Cannon et al. | 707/3 |
| 2007/0271524 A1* | 11/2007 | Chiu et al. | 715/767 |
| 2008/0027985 A1* | 1/2008 | Kasperkiewicz et al. | 707/104.1 |
| 2008/0046410 A1* | 2/2008 | Lieb | 707/3 |
| 2008/0050015 A1* | 2/2008 | Lu et al. | 382/173 |
| 2008/0052312 A1* | 2/2008 | Tang et al. | 707/104.1 |
| 2008/0080743 A1* | 4/2008 | Schneiderman et al. | 382/118 |
| 2008/0263022 A1* | 10/2008 | Kostorizos et al. | 707/5 |
| 2008/0301128 A1* | 12/2008 | Gandert et al. | 707/5 |
| 2009/0019031 A1* | 1/2009 | Krovitz et al. | 707/5 |
| 2009/0049392 A1* | 2/2009 | Karttunen et al. | 715/762 |
| 2009/0064029 A1* | 3/2009 | Corkran et al. | 715/781 |
| 2009/0094210 A1* | 4/2009 | Reinhardt et al. | 707/3 |
| 2009/0154795 A1* | 6/2009 | Tan et al. | 382/155 |
| 2009/0307623 A1* | 12/2009 | Agarawala et al. | 715/765 |
| 2010/0013603 A1* | 1/2010 | Chatani et al. | 340/10.6 |

\* cited by examiner
† cited by third party

OBJECT SEARCH AND NAVIGATION METHOD AND SYSTEM

CROSS REFERENCE TO RELATED APPLICATIONS

This application claims the benefit of U.S. Provisional Patent Application No. 61/078,789 filed on Jul. 8, 2008, which is incorporated herein by reference.

BACKGROUND

1. Technical Field

The present invention relates to searching, presenting and navigating within a list of objects, and more particularly, to navigating using content items.

2. Discussion of Related Art

Electronic shopping is becoming evermore elaborate and versatile, yet users are confronted with ever growing range of products that they may wish to choose from. Current problems with electronic commerce are: Overload—A shopper will need to go through hundreds or even thousands of pages in order to get some orientation on the product selection; Requires Familiarity—The are many criteria for narrowing down the selection, yet some of them require the shopper for prior familiarity with the category which could be different has a photo been presented; No sub division—There is no way to really those thousands of deals to major subgroups; No Pareto—There is no for the shopper to focus his efforts on the major products rather than in ancillary products that may find themselves to the higher parts of the pages; Redundancy—in many cases tens of deals with the same offering are presented. These disadvantages may shopping experience tedious.

BRIEF SUMMARY

Embodiments of the present invention provide a computer implemented method of presenting a plurality of visual content items, comprising: grouping the visual content items according to predefined similarity rules relating to visual characteristics of the visual content items such that each group has a range for the number of its members; selecting a representative visual content item for each group; and presenting the representative visual content item of each group that has a minimal number of members above a predefined threshold.

Accordingly, according to an aspect of the present invention, there is provided a computer implemented method, further comprising presenting the plurality of visual content items alongside the representative visual content items.

Accordingly, according to an aspect of the present invention, the grouping may be carried out by using predefined color groups; by using predefined shape groups; or using at least one keypoint of the visual content items, and relate to groups of human faces, product images, landscape images.

Embodiments of the present invention provide a data processing system for analyzing and presenting a plurality of visual content items, comprising: a mediator server comprising a graphical user interface, the mediator server connected via a communication link with a user and with a plurality of sources holding the visual content items, and arranged to group the visual content items according to predefined similarity rules relating to visual characteristics of the visual content items such that each group has a range for the number of its members; and to select a representative visual content item for each group, wherein the graphical user interface is arranged to present the representative visual content items of each group that has a minimal number of members above a predefined threshold.

Accordingly, according to an aspect of the present invention, there is provided a data processing system, wherein the graphical user interface is arranged to present the representative visual content items alongside the visual content items.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will now be described in the following detailed description of exemplary embodiments of the invention and with reference to the attached drawing, in which dimensions of components and features shown are chosen for convenience and clarity of presentation and are not necessarily shown to scale. Generally, only structures, elements or parts that are germane to the discussion are shown in the figure.

DETAILED DESCRIPTION

Figure 1:
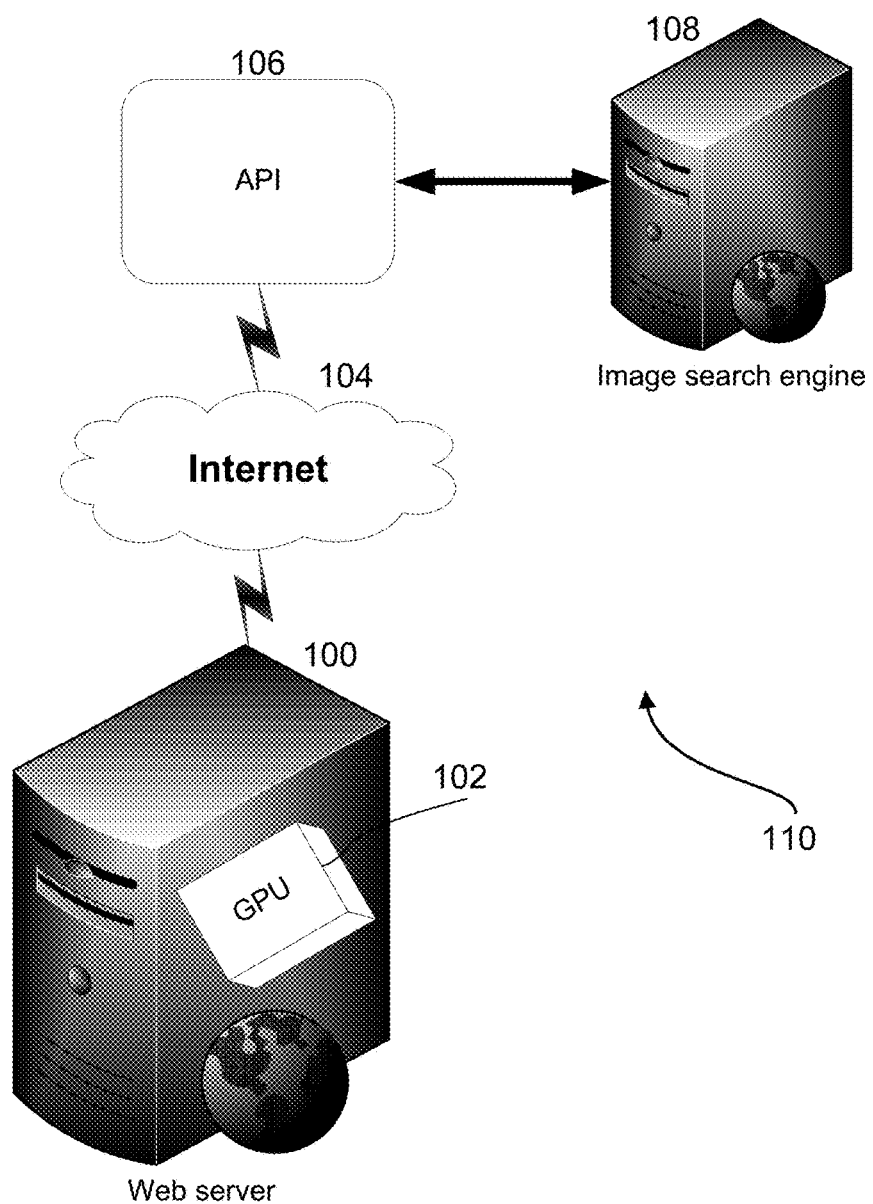
FIG. 1 is a schematic illustration of a system setup in accordance with an exemplary embodiment of the invention.

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be interpreted as limiting, but rather as a basis and/or principle for the claims, and/or as a representative basis for teaching one skilled in the art to employ this invention in virtually any appropriately detailed system, structure or manner.

To facilitate understanding the present invention, the following glossary of terms is provided. It is to be noted that terms used in the specification but not included in this glossary are considered as defined according the normal usage of the computer science art, or alternatively according to normal dictionary usage.

The term "GPU" as used herein in this application, is defined as an apparatus adapted to reduces the time it takes to produce images on the computer screen by incorporating its own processor and memory, having more than 4 CPU's such as GeForce 8800.

The term "API" as used herein in this application, is defined as an application program interface that is the software interface to system services or software libraries. API may be a third party's source code interface that supports requests for service, such as yahoo image service API.

The term "URL" as used herein in this application, is defined as Universal Resource Locator. An Internet World Wide Web Address.

The term "Keypoint" as used herein in this application, is defined as interest points in an object. For example, in the SIFT framework, the image is convolved with Gaussian filters at different scales, and then the difference of successive Gaussian-blurred images are taken. Keypoints are then taken as maxima/minima of the Difference of Gaussians. Such keypoints can be calculated for the original image or for a transformation of the original image such as an affine transform of the original images.

The term "Keypoint descriptor" as used herein in this application, is defined as a descriptor of a key point. For example, in the SIFT framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with a 1.5 times the scale of the keypoint. Histograms contain 8 bins each, and each descriptor contains an array of 4 histograms around the keypoint. This leads to a SIFT feature vector with (4×4× 8=128 elements).

The term "RGB" as used herein in this application, is defined as an additive color model in which red, green, and blue light are added together in various ways to reproduce a broad array of colors.

The term "thumbnail" as used herein in this application, is defined as a reduced version of an image, which is commonly included in the image file itself.

The term "Visual content item" as used herein in this application, is defined as an object with visual characteristics such as An image file like BMP, JPG, JPEG, GIF, PNG files; a screenshot; A video file like AVI, MPG, MPEG, MOV, WMV, FLV files or a one or more frame of a video.

The term "Visual analysis" as used herein in this application, is defined as the analysis of the characteristics of visual objects such, as visual similarity, coherence, hierarchical organization, concept load or density, feature extraction and noise removal.

The term "Text similarity" as used herein in this application, is defined as the Measure the pair-wise similarity of strings. Text similarity can score the overlaps found between two strings based on text matching. Identical strings will have a score of 100% while "car" and "dogs" will have close to zero score. "Nike Air max blue" and Nike Air max red" will have a score which is between the two. Other string similarity metrics may also be used.

The term "Labeling" as used herein in this application, is defined as Creating a name for a group of items. For instance in case we are Labeling a product the label will describe several things about the product—who made it, when it was made, where it was made, its content, how is it to be use and how to use it safely.

FIG. 1 is a schematic illustration of a system setup 110, which may benefit from methods in accordance with an exemplary embodiment of the invention. In setup 110, a server 100 is running an object search service. Object can be one of the following: An image file such as BMP, JPG, JPEG, GIF, PNG files; A video file such as AVI, MPG, MPEG, MOV, WMV, FLV files; An audio file such as MP3, WMA, WAV, OGG; A document such as DOC, DOCX, XLS, XML, HTML, PDF files. Optionally, servers such as server 100, uses one or more GPU's such as GPU 102 to accelerate its computations.

Server 100 is connected over a computer network 104 to second server 108. Optionally the communication is done through the API 106 of the second server 108. The API receives the query parameters, and sends back to server 100 the query results. Query results include a list of objects (for example the object files themselves or a list links to each of them). Preferably, such list if significantly longer than the number of object that are normally displayed on one page of a typical display device, for example 300 or 500 objects are returned as the later reordering would usually present a sub set of that list.

Optionally, server 100 has or is connected to GPU 102. Such units usually have two advantages: Multiple processors, at the present commercially available GPU's have 256 or even 320 stream processors while current commercially available Intel processors have 4 processors hence they have an advantage in massively parallel processes. Built in ability to accelerate vector operation such as vector additions and subtractions.

Figure 2:
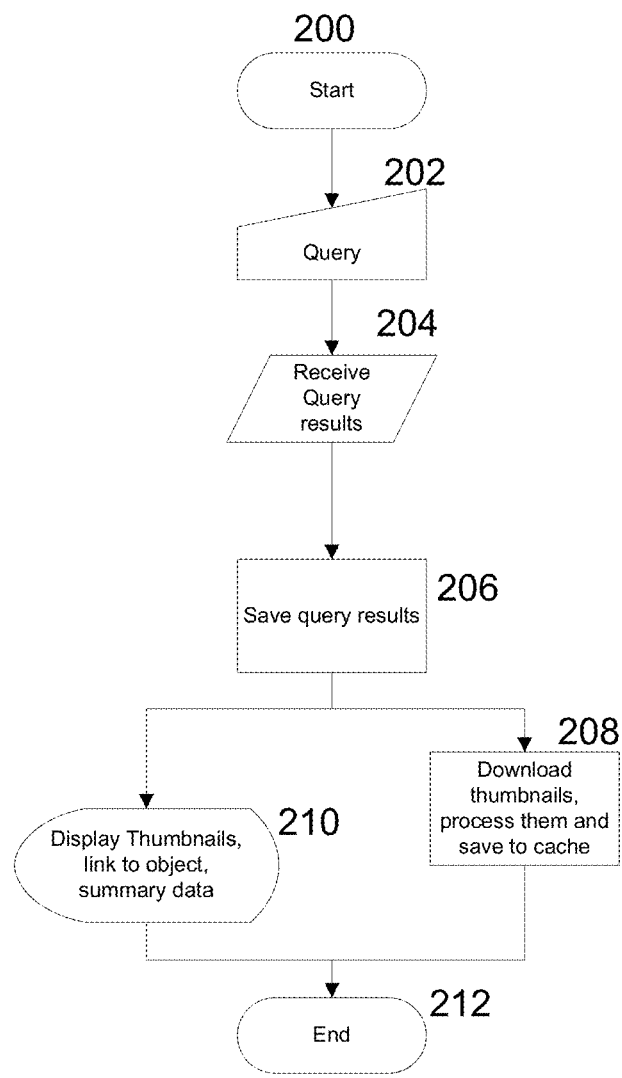
FIG. 2 is a flowchart of acts performed in querying an object, in accordance with an exemplary embodiment of the invention.

FIG. 2 is a flowchart of acts performed in querying an object, in accordance with an exemplary embodiment of the invention; and User input a query 202 (such as a keyword query) to the server 100. The server uses API 106 to submit a query request such request contains fields such as: The application ID; The query to search for; The kind of search to submit; The number of results to return; The starting result position to return; The finishing position, format (such as bmp, gif, jpeg, png); Whether the service should filter out adult content by default; Coloration (such as color, black and white); Site: a domain to restrict searches to; The format for the output; The name of the callback function to wrap around the data if needed; The API 106 responds 204 with fields such as: Result Set: Contains all of the query responses. Has attributes, The number of query matches in the database, The number of query matches returned, The position of the first result in the overall search; Result: Contains each individual response; Title: The title of the image file; Summary: Summary text associated with the image file; Url: The URL for the image file; Click Url: The URL for linking to the image file; Referer Url: The URL of the web page hosting the content; File Size: The size of the file in bytes; File Format: One of bmp, gif, jpg, or png; Height: The height of the image in pixels; Width: The width of the image in pixels; Thumbnail: The URL of the thumbnail file and its height and width in pixels; Publisher: The creator of the image file.

Restrictions: Provides any restrictions for this media object. Restrictions include noframe and noinline. Noframe means that you should not display it with a framed page on your site. Noinline means that you should not inline the object in the frame up top. Copyright: The copyright owner. Alternatively or additionally, some or all the query results can be received from the memory or storage device of server 100. For example they can be retrieved from cached query results saved in stage 206 of a previous query. There are at least two possible ways to decide whether to search the query results in the memory or storage: The query is identical or similar to a previous query; the links are identical to links stored in the memory or storage. The Server then presents the query results, preferably in the order received on the user's screen as shown in screen shot 402 of FIG. 4. Optionally, query results are than saved 206.

Following that, two processes run in parallel: 208: The object thumbnails are downloaded from their respective URL's, this process usually starts first 210: Displaying the thumbnails of the object's on the users display and further information such as the link to the original object and summary data. Alternatively, this process can happen one after another and not in parallel.

Figure 3:
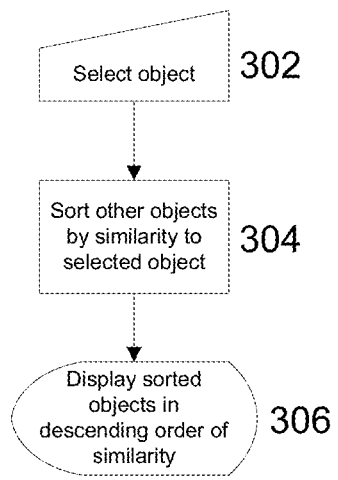
FIG. 3 is a flowchart of acts performed after an object has been selected, in accordance with an exemplary embodiment of the invention.

FIG. 3 is a flowchart of acts performed after an object has been selected, in accordance with an exemplary embodiment of the invention. An object is selected 302 by means of mouse click, mouse double click or any other way that enables a user to select it, an example can be shown in the selection of object 410 in FIG. 4. Consequently, the objects received in step 204, such as the objects presented in screen shot 402 of FIG. 4, are sorted 304 according to their similarity to the selected object.

There are several ways to perform such sorting: Using methods such as Scale-invariant feature transform or similar methods such as GLOH (Gradient Location and Orientation Histogram), PCA-SIFT and MSR. Such method usually use keypoint localization step, an later on compare many keypoint descriptors in one object to a plurality of keypoint descriptors in another object and hence require quick computation in order to compare an object to a plurality of object within a response time an ordinary user would expect. The higher the number or the percentage of keypoint descriptors in a first object than match (exactly or approximately) keypoint descriptors in a second object the higher is the similarity between the two objects. Using methods such as Haar wavelet transform. Comparing the color histograms of the object to other color histograms. Categorizing, for example dividing images to images with human faces, or human skin vs. other images using face detection of human skin detection software program. The methods can be used separately, one after another or in parallel. In case a heavily computational method such as (a) is used it is advisable to use a GPU such as 102 to attain a reasonable response time.

Once or in parallel to sorting 304 the objects are presented 306 to the user in descending order of similarity. This way the user can focus on the objects that are most similar to the selected object. Optionally, objects that have a similarity lower than a certain threshold would not be presented. The objects compared during process 304 can be either the thumbnails or the object files themselves.

Figure 4:
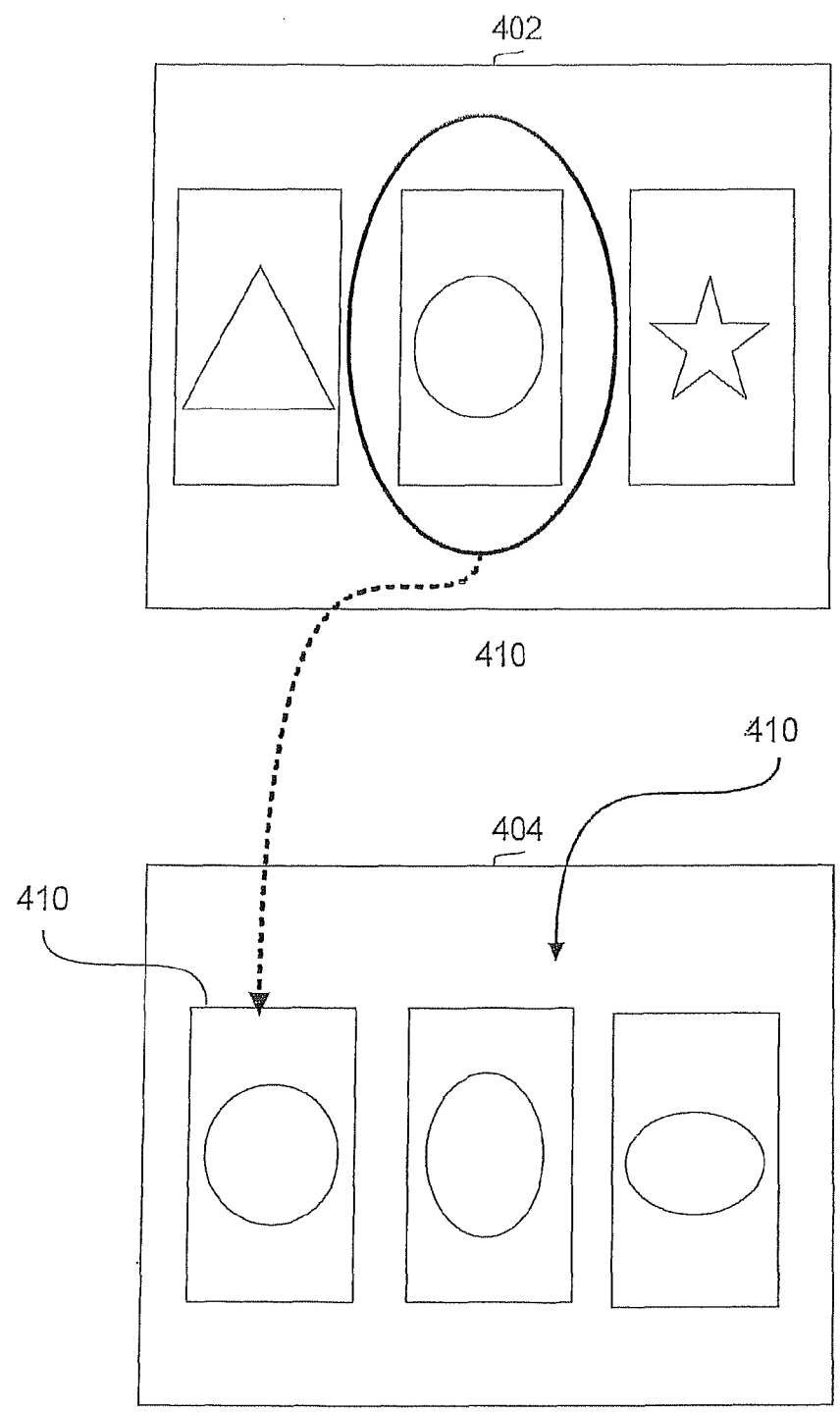
FIG. 4 Shows screen shots of the results of exemplary embodiment of the invention.

FIG. 4 Shows screen shots of the results of stages 210 and 306. Screen shot 402 shows the results of step 210. It can be seen that the object are not necessarily sorted according to their similarity to object 410. Once object 410 has been selected by the user, the sort process 304 is performed. Consequently in step 306 the sorted objects are presented as shown in screen shot 404. Object 410 is shown first and the other object are presented right and down to him in descending order of similarity. The end result is that once the user has selected object 410, it received back only object 410 and its similar objects. This was the process of paging back and forth to collect similar objects in an object search engine is saved and higher productivity is achieved.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

Figure 5:
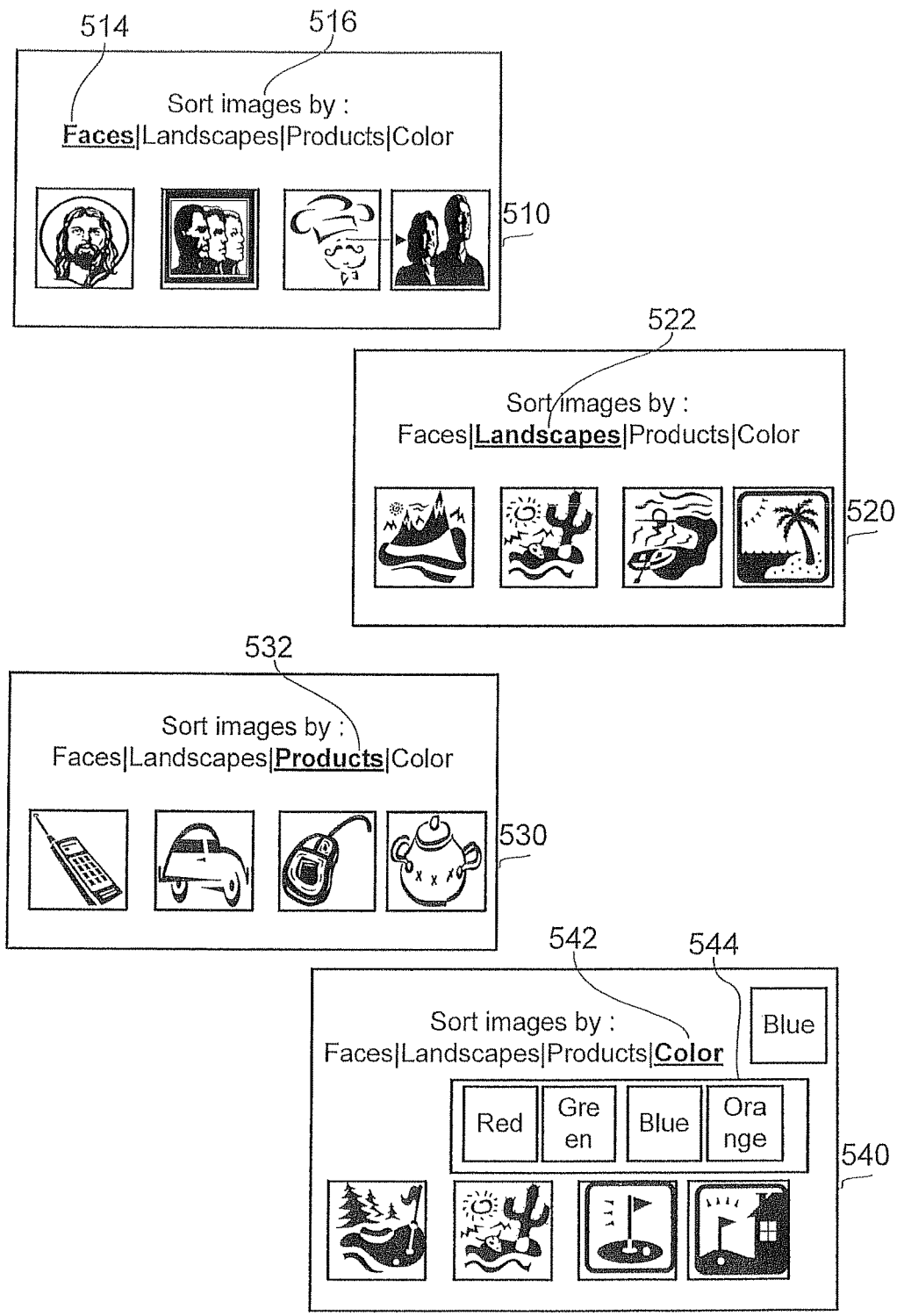
FIG. 5 Shows screen shots of the results of the process defined in FIG. 6 in accordance with an exemplary embodiment of the invention.
Figure 6:
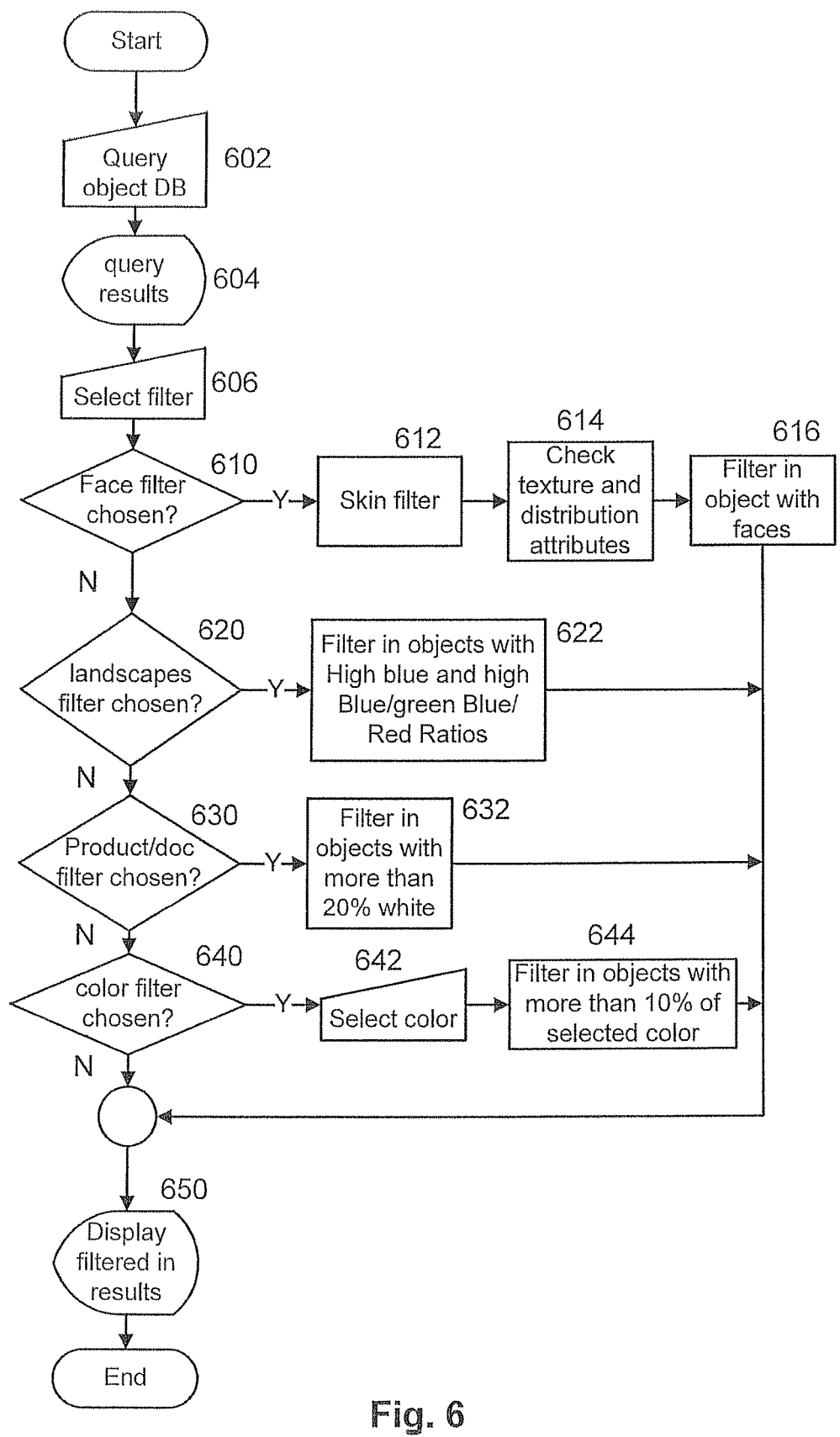
FIG. 6 is a flowchart of acts performed after a query has been submitted, in accordance with an exemplary embodiment of the invention.

FIG. 5 Shows screen shots of the results of the process defined in FIG. 6 in accordance with an exemplary embodiment of the invention. Screen shot 510 shows a search results page in which the text item "rokefeller" was searched as shown in step 602 of FIG. 6. Since the Faces filter 516 has been selected in the category selection area 514, the systems filters in items that are most probably faces according to its parameters as described in steps 612 to 616 of FIG. 6. Hence, the user can narrow the search to faces.

Screen shot 520 shows a search results page in which the text item "rokefeller" was searched as shown in step 602 of FIG. 6. Since the landscapes filter 522 has been selected the systems filters in items that are most probably landscapes according to its parameters as described in step 622 of FIG. 6. Hence, the user can narrow the search to landscapes.

Screen shot 530 shows a search results page in which the text item "phones" was searched as shown in step 602 of FIG. 6. Since the products filter 532 has been selected the systems filters in items that are most probably products according to its parameters as described in step 632 of FIG. 6. Hence, the user can narrow the search to products. In a similar manner the process described in screen shot can apply to documents.

Screen shot 540 shows a search results page in which the text item "rockefeller" was searched as shown in step 602 of FIG. 6. Since the color filter 542 has been selected the lets the user selects, as described in step 642 of FIG. 6, the dominant color 544 to look for. The system filters in items that are have this dominant color as described in step 632 of FIG. 6. Hence, the user can narrow the search to objects with the dominant color 544.

FIG. 6 is a flowchart of acts performed after a query has been submitted, in accordance with an exemplary embodiment of the invention. The user queries the system with an object query such as a text query or such as the process defined in FIG. 2. The query results are displayed 604. The user can than choose 606 to filter the results according to several categories such as: Faces 514; Landscapes 522; Products 532; and Color 542; Alternatively the user can choose the filters prior to performing the query.

The following processes described below assume that a plurality of objects has at least one image (such as a thumbnail, or the image file itself, a video frame) that represents one or more of the object query results, and the filters are applied to one or more of those images.

In case a face filter has been chosen 610, a human skin filtering is performed 612 over the image, and filters in pixels suspected to be of human skin.

A further texture and pixel distribution are further performed 614 (before, after or in parallel to 612) to filter images that are most probably to include a human face. For example the relative area of the human skin divided by the total image are should be above a certain predefined percentage. Any object that is suspected to include a human face image is filtered in 616 to be displayed in step 650.

In case a landscapes filter has been chosen 620, a landscape filtering is performed 622 over the images. For example, in an RGB representation of each pixel in each image Blue (=B), Green(=G) and Red (+R) intensities are taken or calculated. In case: B is above threshold $b_1$; and B/G is above threshold $bg_1$; and B/R is above threshold $br_1$; Or in case: B is above threshold $b_2$; and B/G is above threshold $bg_2$; and B/R is above threshold $br_2$; Than the pixel is considered a landscape pixel.

In the case that in a predefined area of the image the ratio of landscape pixels divided by the total number of pixels in that area exceeds a certain threshold, the image is considered a landscape image.

Alternatively, a similar process calculates the ration between black pixels and the total number of pixels in a predefined area to filter in night time landscape images. In that case a black pixel is defined for example as a pixel in which: $R<tbr_1$ and $G<tbg_1$ and $R<tbr_1$. Any object that is suspected to be landscape image is filtered in 622 to be displayed in step 650.

In case a product/document filter has been chosen 630, a landscape filtering is performed 632 over the images. For example, in an RGB representation of each pixel in each image Blue (=B), Green(=G) and Red (+R) intensities are taken or calculated. In case: B is above threshold $bw_1$; and G is above threshold $gw_1$; and R is above threshold $rw_1$; The pixel is considered "white".

In the case that in a predefined area of the image the ratio of white pixels divided by the total number of pixels in that area exceeds a certain threshold, the image is considered a product or document image. Any object that is suspected to be product/document image is filtered in 632 to be displayed in step 650.

In case a color filter has been chosen 640, the system allows the user to choose 642 between a set of predefined dominant colors as shown in item 544 of FIG. 6.

A dominant color filtering 644 is than performed, For example, in an RGB representation of each pixel in each image Blue (=B), Green(=G) and Red (+R) intensities are taken or calculated. In case the "orange" color has been selected than if: R/G is above threshold $O_1$; and G/B is above threshold $O_2$; and R is above threshold $O_3$; The pixel is considered "Orange".

In the case that in a predefined area of the image the ratio of "Orange" pixels divided by the total number of pixels in that area exceeds a certain threshold, the image is considered an image with a dominant orange color. Any object that is suspected to be an image with a dominant orange color is filtered in 644 to be displayed in step 650.

Figure 7:
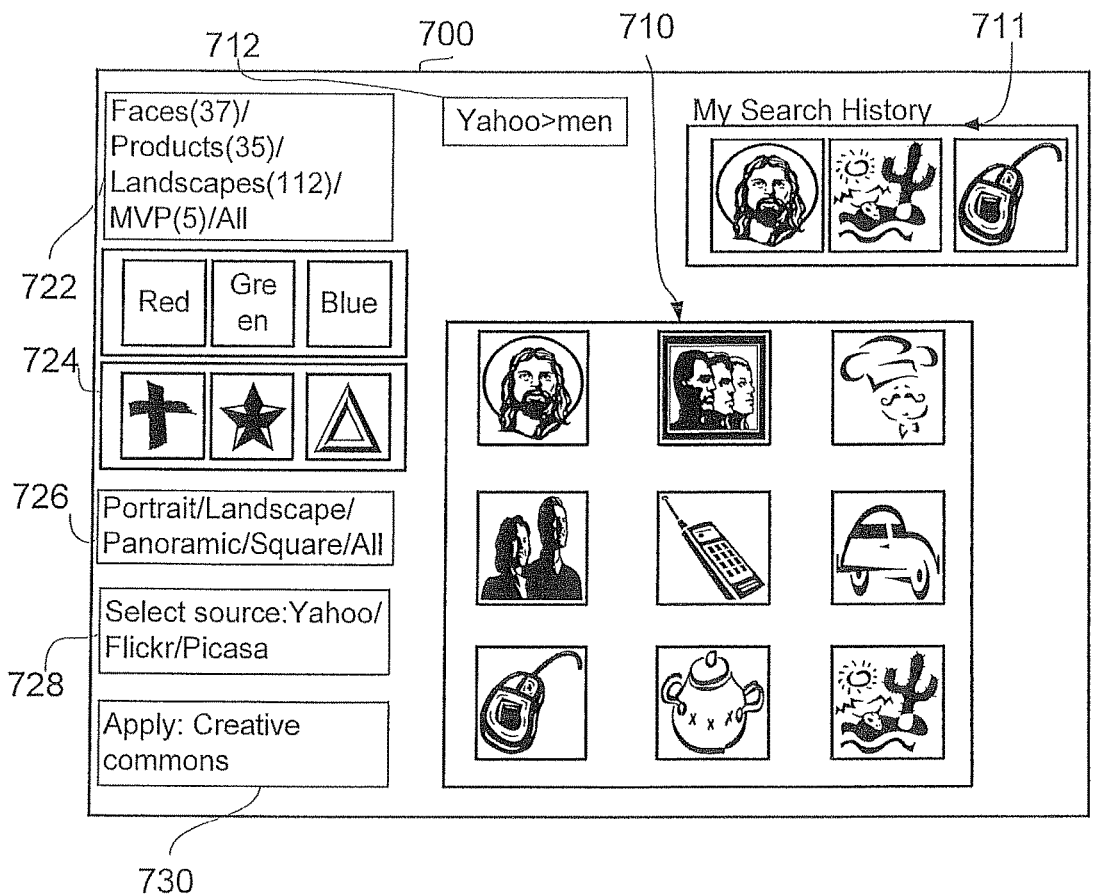
FIG. 7 Shows screen shots of the menu items and search results in accordance with an exemplary embodiment of the invention.

FIG. 7 Shows screen shots of the menu items and search results in accordance with an exemplary embodiment of the invention. Search screen 700 is comprised of: Thumbnails of search results 710; thumbnails of search history 711, such as reduced thumbnails of the images selected in previous searches; Breadcrumbs-A form of text navigation 712 showing a hierarchical structure of the search history. The current location within the search is indicated by a list of searches before the current search in a hierarchy, leading up to the home page. The following menu items: Means 722 to select a category such as Faces, Products, Landscapes or "MVP"—most valuable pictures (further explained in FIG. 10); Means 724 to further search a particular shape as described in FIGS. 8-9; Means 726 to choose an images format such as portrait, landscape or panoramic in which choosing a format will refine the search to images with certain range of height/width ratio; means 728 to conduct the search in a certain image database such as Yahoo images, Flickr images or Picasa; and means 730 to limit the search to a certain license such as creative commons license.

Figure 8:
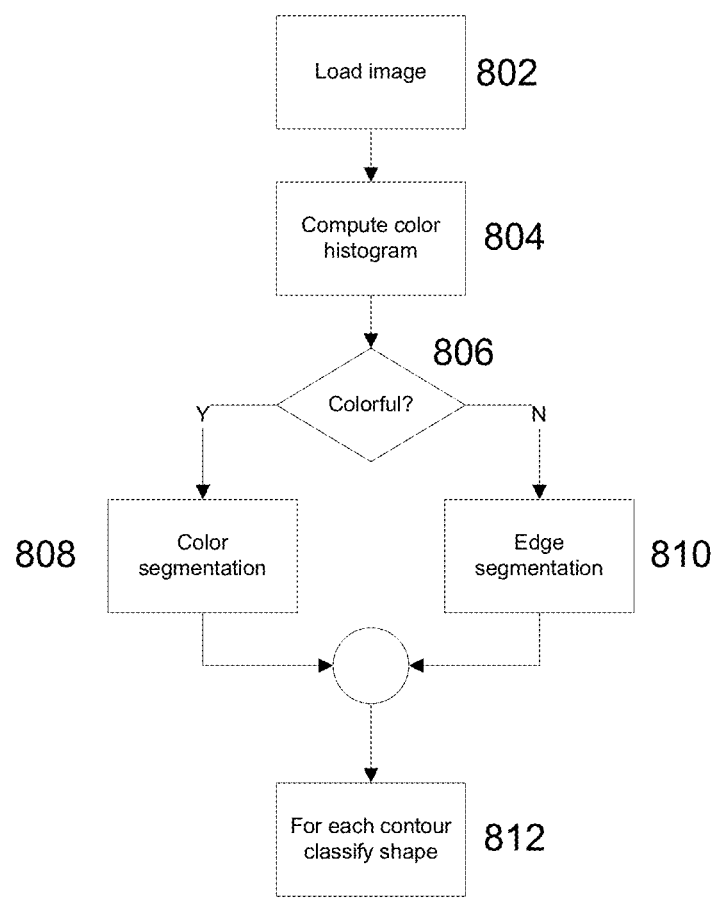
FIG. 8 is a flowchart of acts performed in classifying an image into the shapes, in accordance with an exemplary embodiment of the invention.

FIG. 8 is a flowchart of acts performed in classifying an image into the shapes, in accordance with an exemplary embodiment of the invention. In step 802 an image is loaded. Usually the process described in FIG. 8 is performed at the first time that image is downloaded, but it could be done in other contexts as well. Subsequent to that color histogram is computed 804, than a check is performed 806 for colorfulness—for example, if a certain color range in the color space exceeds a predefined percentage of the image pixels and the rest of the color ranges are below another predefined threshold than the image is considered colorful. If the image is colorful the flow is passed to step 808 in which a color segmentation is done—searching the borders of each color cluster, and all the significant contours in the image are collected. If the image is not colorful the flow is passed to step 810 in which an edge detection such as "Sobel" is performed, all connected components above a certain size collected into contour collection. Then, in step 812 for each of the contours collected by either step 808 or 810 the process defined in FIG. 9 is performed.

Figure 9:
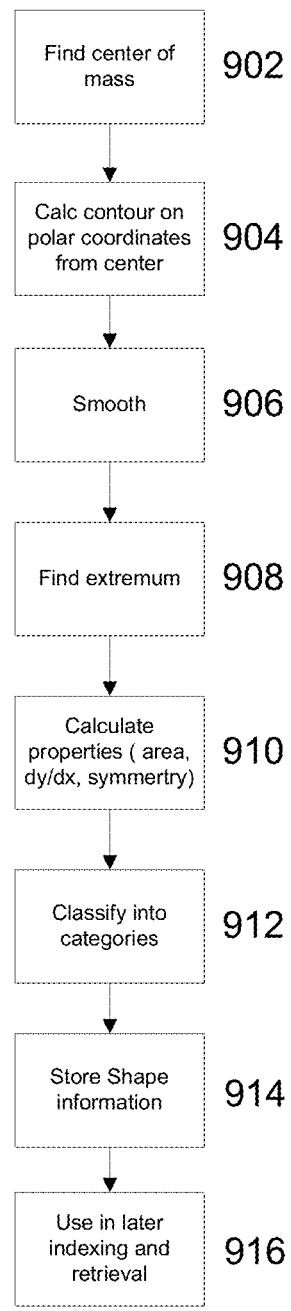
FIG. 9 is a flowchart of acts performed on each contour collected in, in accordance with an exemplary embodiment of the invention.

FIG. 9 is a flowchart of acts performed on each contour collected in step 808 or 810, in accordance with an exemplary embodiment of the invention. For the contour: A center of the contour is found 902, such as its center of mass; the contour is transformed 904 into polar coordinates (r, θ); one or more of the contour coordinates are smoothed 906 using methods such as "moving average", applying various filters, or other smoothing methods. Extremum (a point where a function reaches a maximum or a minimum) points of the contour in polar coordinates are calculated 908. Further properties of the contour are calculated 910 such as its area, the ration between its height and width and its symmetry. All the calculated parameters are used to classify 912 the contour into shapes, for example a contour with not extremum points and height to width ratio of 1 and totally symmetrical is a circle shape. Optionally, the shape information such as number, size, location, rotation texture and color is stored 914. Optionally, the stored information is later used for indexing and retrieval 916 of the visual content items.

Figure 10:
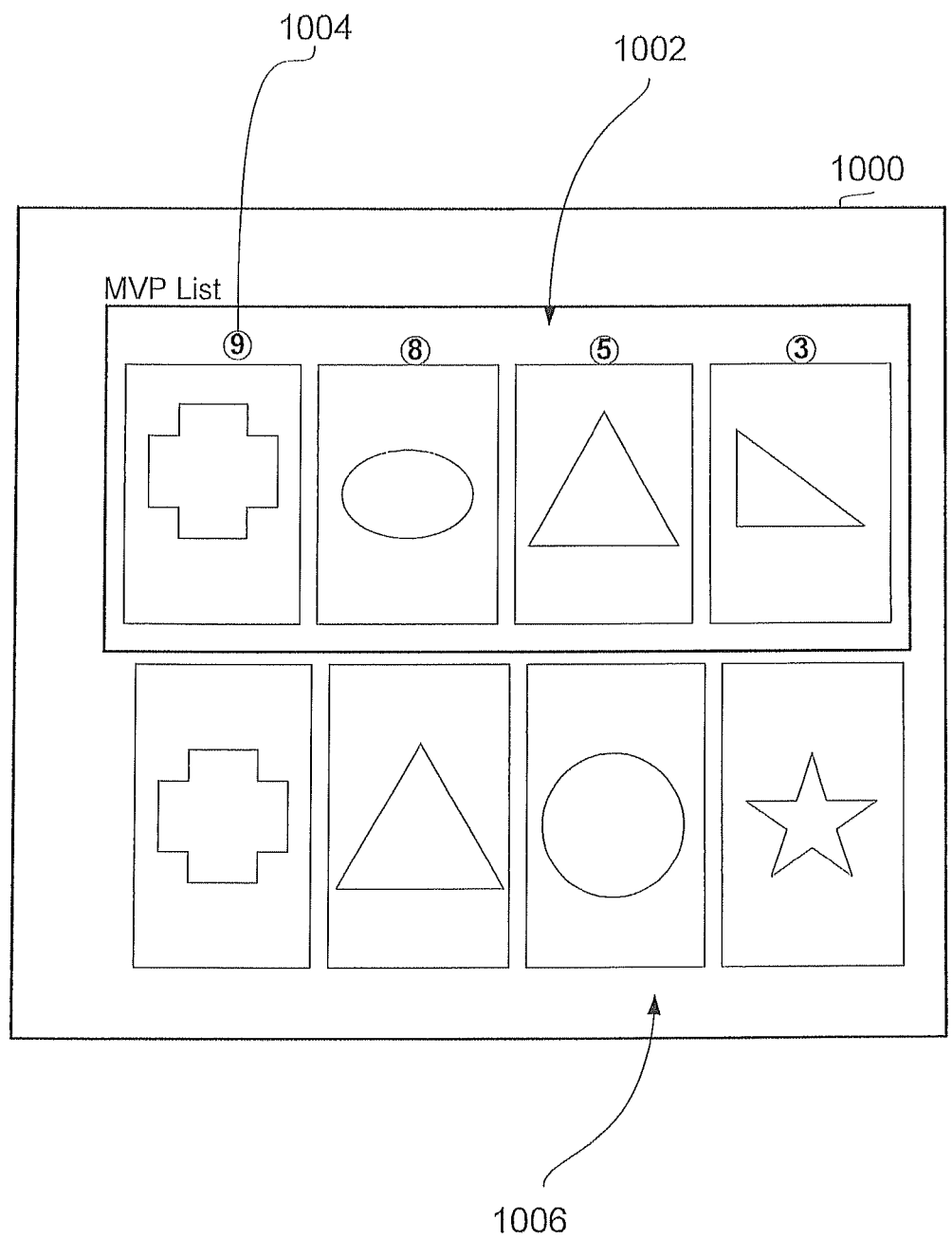
FIG. 10 shows screen shots of screen shot with MVP results in accordance with an exemplary embodiment of the invention.

FIG. 10 Shows screen shots of screen shot with MVP results in accordance with an exemplary embodiment of the invention. Screen shots 1000 is comprised of: a collection of image thumbnails 1006; a collection 1002 of "MVP" images—the dominant images in the current search such as a row of images; and an indicator 1004 of the number of times each of the MVP objects appear in the set.

When the MVP control is pressed 722 or after the image set is downloaded or in any other stage, the images in the image set are compared to each other and similar images (for example, image with close to identical color histogram and/or above a certain two dimensional correlation coefficient to each other) are collected into clusters. If clusters than contain exceed a certain number of images are presented in descending order of the number of images.

In certain cases in which it is clear that a significant part of the image set to be presented is comprised of images of a certain category such as: Faces, products, landscapes, images with a dominant red color, cross shapes, or black and white images, this subset will be presented first in its own row such as in 1002.

Figure 11:
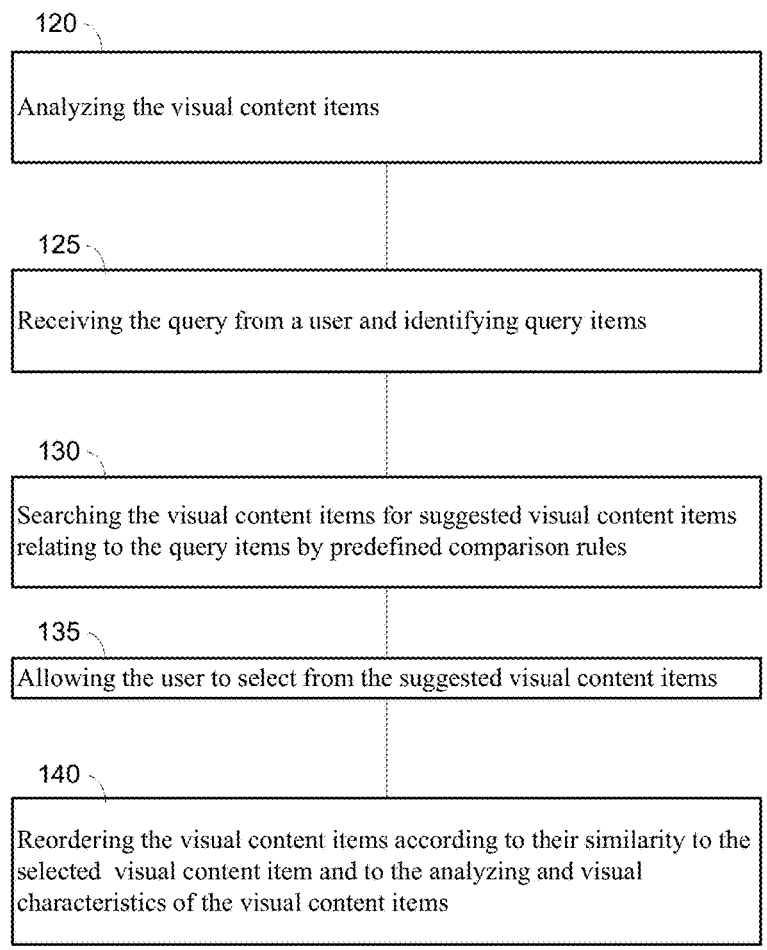
FIGS. 11 and 12 are high level flowcharts illustrating a computer implemented method of running a query item on a plurality of visual content items, according to some embodiments of the invention.
Figure 12:
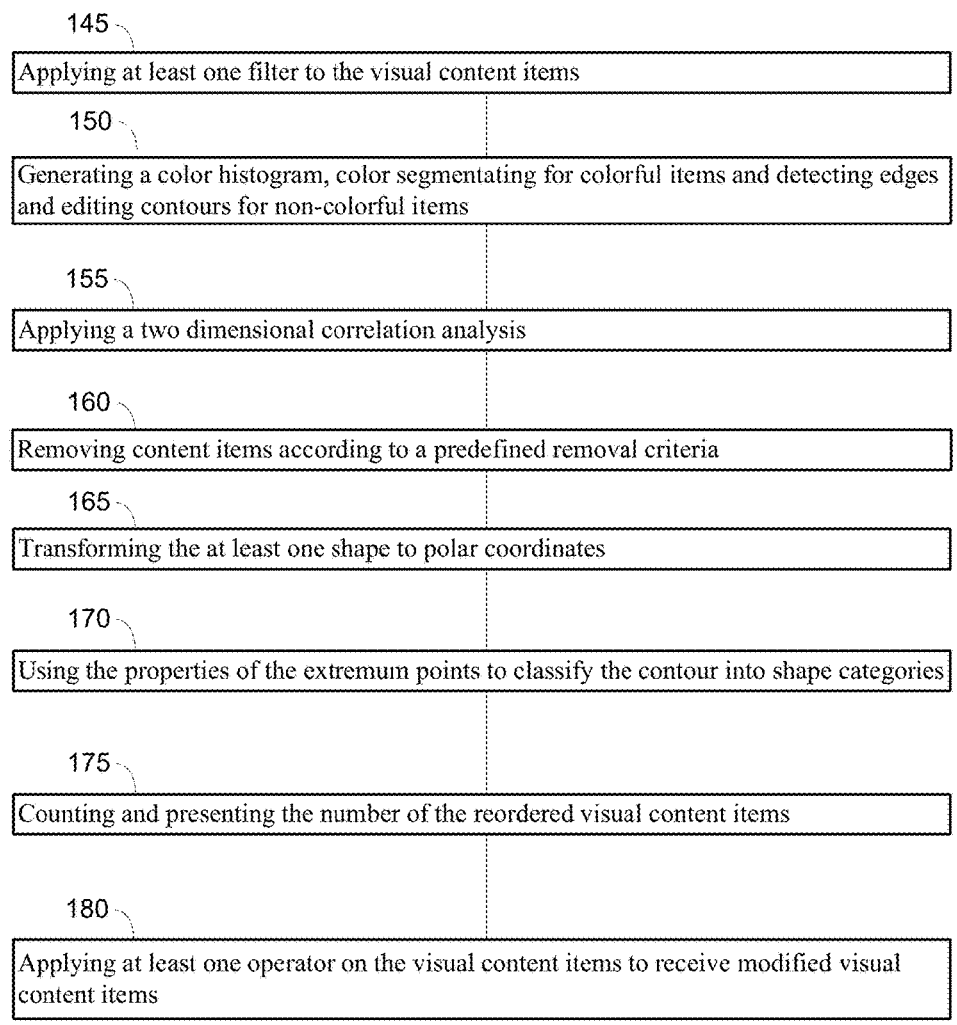

FIGS. 11 and 12 are high level flowcharts illustrating a computer implemented method of running a query item on a plurality of visual content items, according to some embodiments of the invention. Query item may comprise text, images or generally multimedia files, and may comprise various shapes. The computer implemented method comprises the following stages: analyzing the plurality of visual content items according to predefined analysis rules relating to visual characteristics of the visual content items (stage 120); receiving the query from a user and identifying at least one query item (stage 125), e.g., using a third party's source code interface that support requests for services; searching the visual content items for a plurality of suggested visual content items relating to the query items by predefined comparison rules (stage 130), suggested visual content items may comprise thumbnails of selected visual content items; allowing the user to select at least one of the suggested visual content items (stage 135); and reordering the visual content items according to their similarity to the selected visual content item and to the analyzing and visual characteristics of the visual content items (stage 140).

According to some embodiments of the invention, the computer implemented method may further comprise applying at least one filter to the visual content items (stage 145). The filter may be a landscape filter, a face filter, a shape filter, product/document filter, or a color filter. The filter application (stage 145) may be carried out by using a keypoint descriptors comparison or by using a dedicated graphics rendering device.

According to some embodiments of the invention, analyzing the visual content items (stage 120) may comprise generating a color histogram, color segmentating for colorful items and detecting edges and editing contours for non-colorful items (stage 150), wherein items are identified as colorful or non-colorful according to the color histogram and at least one predefined threshold. Analyzing the visual content items (stage 120) may additionally or alternatively comprise applying a two dimensional correlation analysis (stage 155). Analyzing the visual content items (stage 120) may comprise analyzing the content items according to shapes occurring in the query items.

According to some embodiments of the invention, the computer implemented method may further comprise removing content items according to a predefined removal criteria (stage 160) such as an absence of the at least one shape from the query items.

According to some embodiments of the invention, the computer implemented method may further comprise transforming the shapes to polar coordinates (stage 165), finding extremum points in contours of the shapes, and using the properties of the extremum points to classify the contour into shape categories (stage 170).

According to some embodiments of the invention, the computer implemented method may further comprise counting and presenting the number of the reordered visual content items (stage 175).

According to some embodiments of the invention, the computer implemented method may further comprise applying at least one operator on the visual content items to receive modified visual content items (stage 180). Reordering the visual content items (stage 140) may be carried out in further relation to the modified visual content items. Reordering the visual content items (stage 140) may be carried out by classifying the visual content items to predefined categories relating to the query terms and the analysis of the visual content items.

Figure 13:
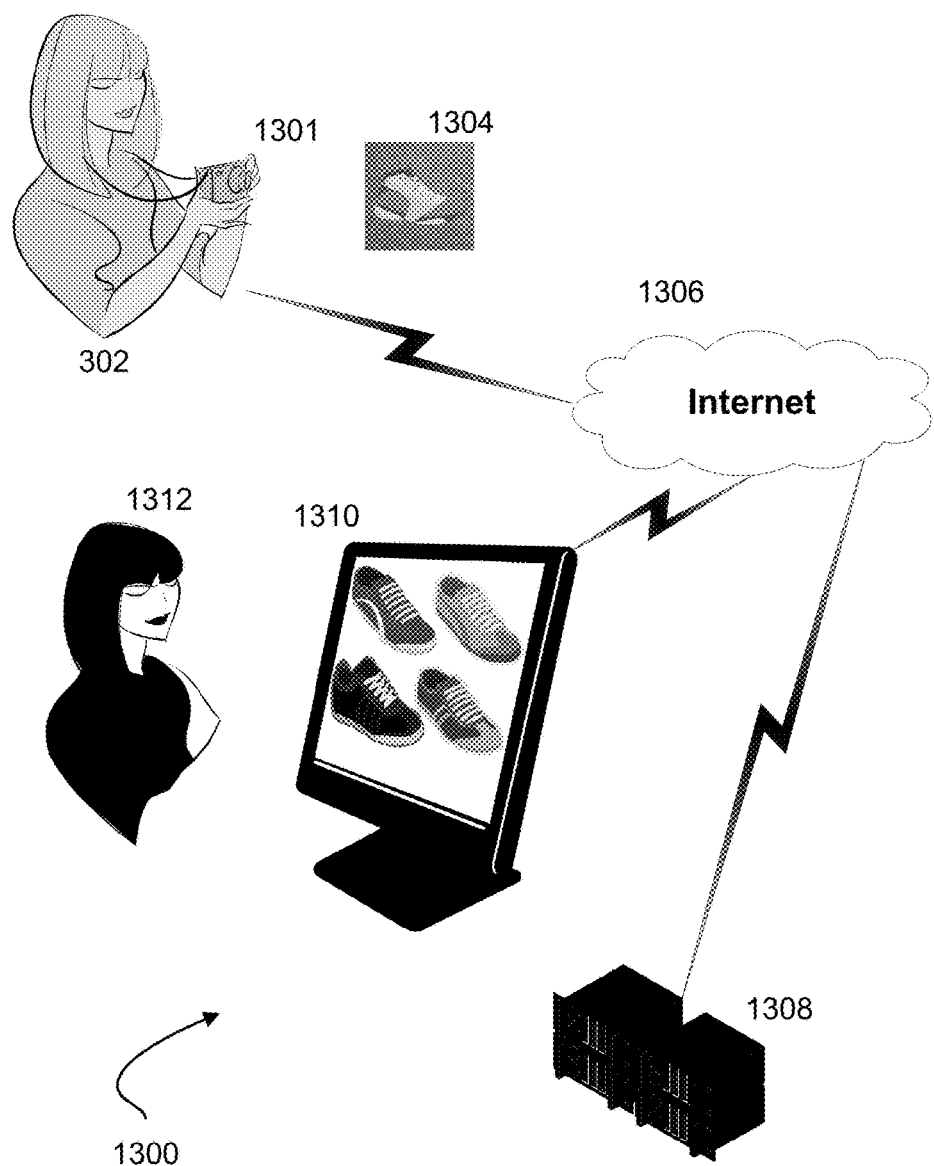
FIG. 13 is a scheme describing the system and process in accordance with an exemplary embodiment of the invention.

FIG. 13 is a scheme describing the system and process in accordance with an exemplary embodiment of the invention. System 1300 performs the process described hereinafter: A person 1302 captures using a capturing means 1301 a visual object of a tangible object 1304. The visual object is sent over a network 1306 such as the internet to a processing system 1308. Processing system comprises multiple processing units configured to allow larger scale processing. A preferably multi-core processors system 1308 runs the grouping algorithm described in FIG. 3. Partial or full results are sent over network such as 1306 to a user terminal 1310. User terminal 1310 displays the results end user 1312.

Figure 14:
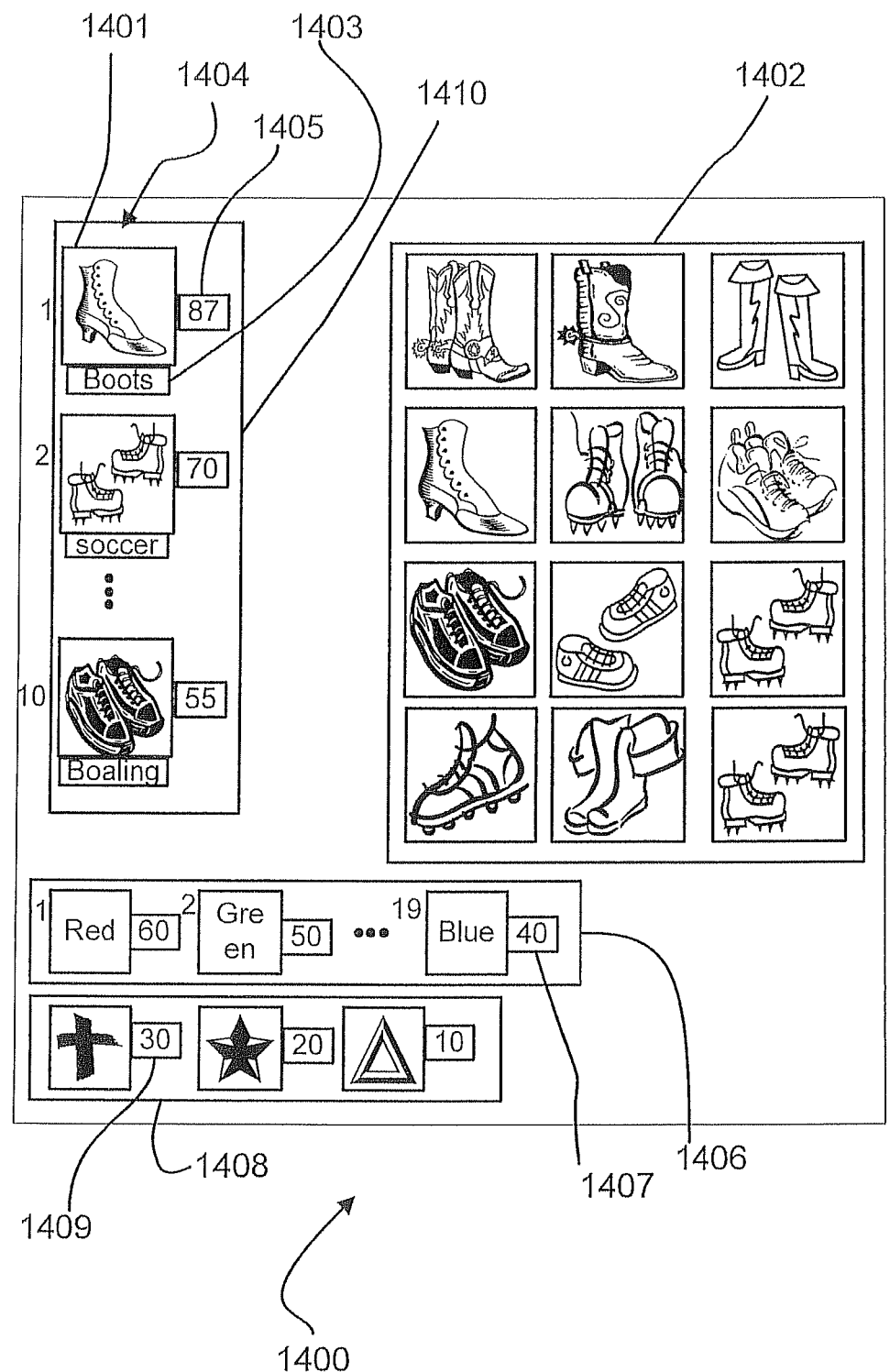
FIG. 14 is a scheme describing the system in accordance with an exemplary embodiment of the invention.
Figure 15:
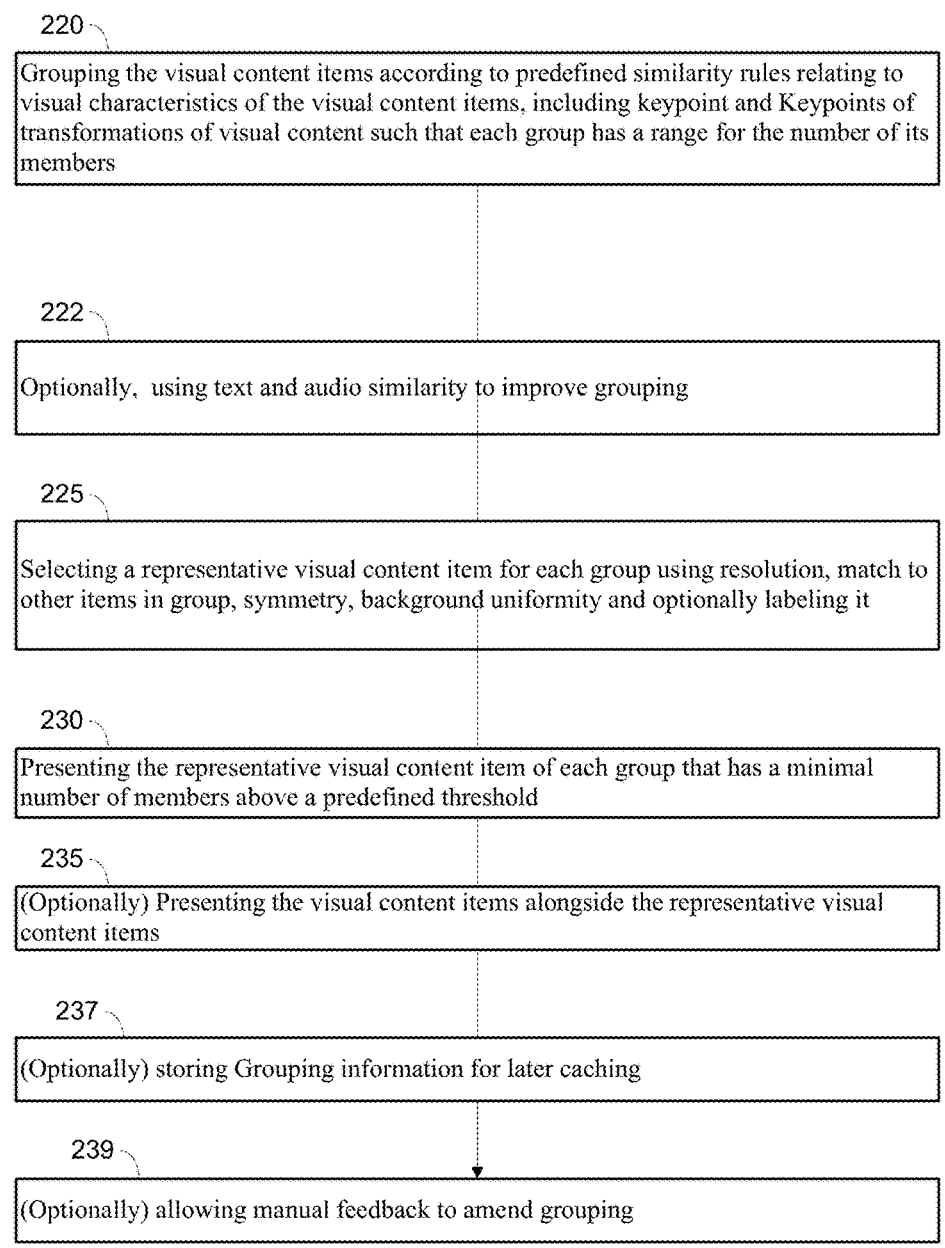
FIG. 15 is a high level flowchart illustrating a computer implemented method of presenting a plurality of visual content items, according to some embodiments of the invention.

FIG. 14 is a scheme describing the system in accordance with an exemplary embodiment of the invention. System 1400 is a display showing: A first subpart 1402 showing several content items, in this case product photos with their prices and titles. A second subpart showing simultaneously 10 clusters. Each of this clusters was calculated using cluster analysis of the content items: A major part of the objects were compared to each other and similar objects were collected to the same cluster. The top 10 clusters are presented by their number of members in descending order, next to each of them their respective number of elements is presented. A third subpart 1406 showing the number 1407 of objects containing a significant area of each of the predefined 19 colors. A fourth subpart 1408 showing the number 1409 of objects containing a shapes area of each of the predefined set of shapes.

FIG. 14 is a scheme describing the system in accordance with an exemplary embodiment of the invention. System 1400 is a display showing: A first subpart 1402 showing several content items, in this case product photos with their prices and titles. A second subpart 1410 showing simultaneously 10 clusters. Each of this clusters was calculated using cluster analysis of the content items: A major part of the objects were compared to each other and similar objects were collected to the same cluster. The top 10 clusters 1404 are presented by their number of members in descending order, next to each of them their respective number of elements is presented. Selecting each of them such as clicking on 1401 will result in presenting only the content items that belong to its group. Each of the groups can display the number of its members 1405 and have a label 1403 as described in stage 225. A third subpart 1406 showing the number 1407 of objects containing a significant area of each of the predefined 19 colors. A fourth subpart 1408 showing the number 1409 of objects containing a shapes area of each of the predefined set of shapes; selecting a representative visual content item for each group (stage 225), such selection uses the visual items parameters such as using each object's visual match to other items in group, its resolution symmetry, background uniformity, optionally the group is labeled using the text fields of its items; and presenting the representative visual content item of each group that has a minimal number of members above a predefined threshold (stage 230). The computer implemented method may further comprise presenting the plurality of visual content items alongside the representative visual content items (stage 235). The computer implemented method may further comprise storing grouping information for later caching for a certain period of time (fixed or calculated by the relative change in the items set) of said results (stage 237). The computer implemented method may further allowing for manual change of the groups such as deletion, insertion, subdivision or merger of groups (stage 239).

According to some embodiments of the invention, the range may be a fixed number. According to some embodiments of the invention, grouping (stage 220) may be carried out by using predefined color groups, or predefined shape groups, or any other categorization. Grouping (stage 220) may be carried out using at least one keypoint of the visual content items. At least one of the groups may comprise human faces, product images, landscape images, or any other item category. The visual content items may be product offerings, for example such that are presented on an online market place.

According to some embodiments of the invention, the representative visual content items of each group may be presented in descending order of their range for the number of its members. The representative visual content items may be reduced images, such as thumbnails, and may be presented on a predefined sub part of a users' display, or on a separate window.

Figure 16:
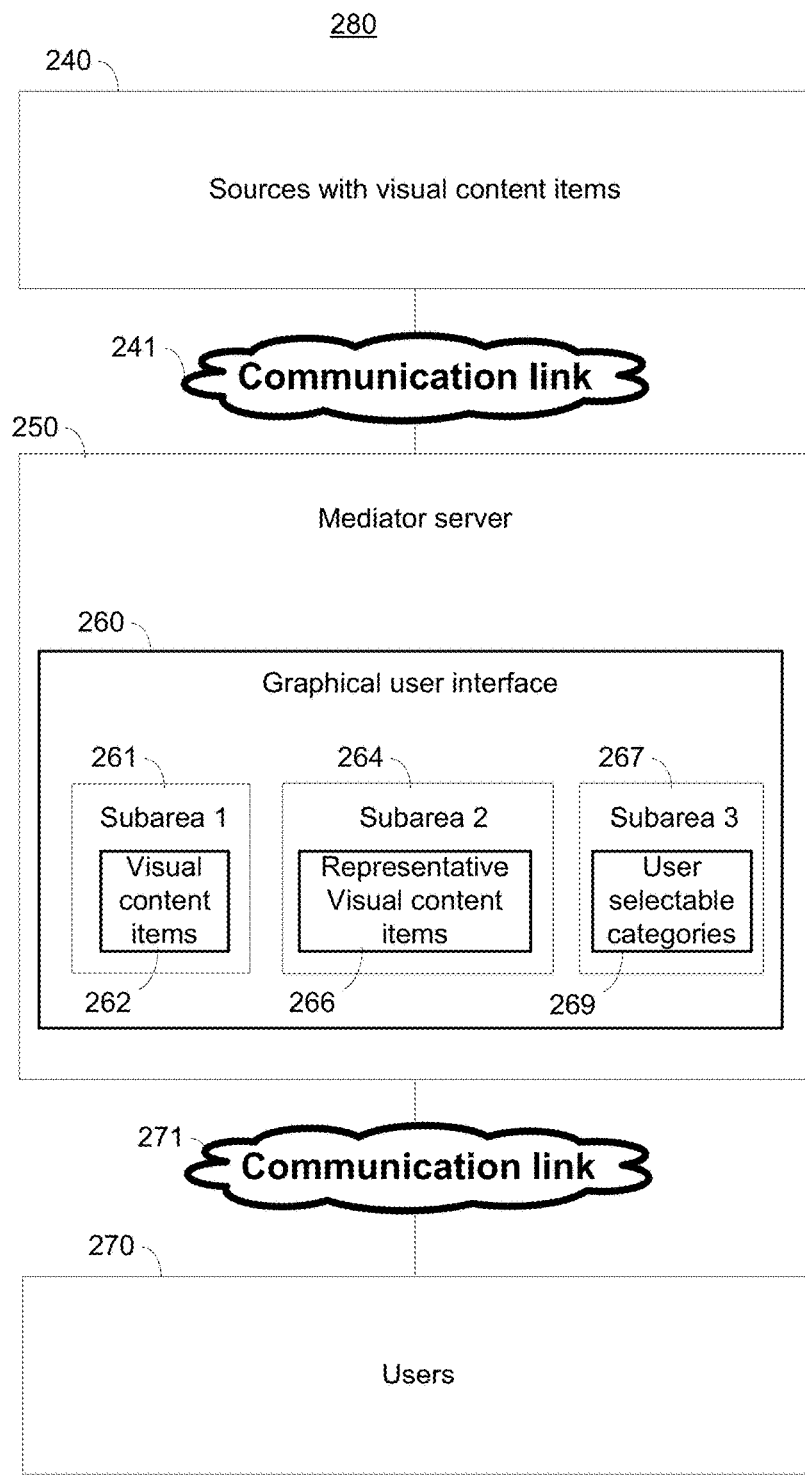
FIG. 16 is a high level block diagram illustrating a data processing system for analyzing and presenting a plurality of visual content items, according to some embodiments of the invention.

FIG. 16 is a high level block diagram illustrating a data processing system 280 for analyzing and presenting a plurality of visual content items 262, according to some embodiments of the invention. Data processing system 280 comprises a mediator server 250 comprising a graphical user interface 260. Mediator server 250 is connected via a communication link 271 with users 270 and via a communication link 241 with a plurality of sources holding the visual content items 240. Mediator server 250 is arranged to group visual content items 262 according to predefined similarity rules relating to visual characteristics of visual content items 262 such that each group has a range for the number of its members; and to select a representative visual content item 266 for each group. Graphical user interface 260 is arranged to present representative visual content items 266 of each group that has a minimal number of members above a predefined threshold. Graphical user interface 260 may be arranged to present representative visual content items 266 in a predefined subarea 264 of the display, alongside visual content items 262 presented in a different subarea 261. A further subarea 267 may be allocated for user selectable categories 269.

According to some embodiments of the invention, the range may be a fixed number. According to some embodiments of the invention, grouping may be carried out by using predefined color groups, or predefined shape groups, or any other categorization, relating to user selectable categories 269 or unrelated thereto. Grouping may be carried out in advance, responsive to user selections and queries, or on the fly dynamically on the inventory of visual content items 262. Grouping may be carried out by mediator server 250 using at least one keypoint of the visual content items. At least one of the groups may comprise human faces, product images, landscape images, or any other item category. Visual content items 262 may be product offerings, for example such that are presented on an online market place. According to some embodiments of the invention, representative visual content items 266 of each group may be presented in descending order of their range for the number of its members. Representative visual content items 266 may be reduced images, such as thumbnails.

According to some embodiments of the invention, a data processing system for running a query item on a plurality of visual content items is presented. The data processing system comprises a mediator server (hosting API 106) connected via a communication link (e.g., internet 104) with a user and with a plurality of sources holding the visual content items (through web server 100 with GPU 102), and arranged to analyze the plurality of visual content items according to predefined analysis rules relating to visual characteristics of the visual content items; to receive the query from the user and to identify at least one query item therein; to search the visual content items for a plurality of suggested visual content items relating to the query items by predefined comparison rules; to allow the user to select at least one of the suggested visual content items; and to reorder the visual content items according to their similarity to the selected visual content item and to the analyzing and visual characteristics of the visual content items.

According to some embodiments of the invention, the systems and methods groups similar images into the same group, and then presets the major groups in descending order, larger groups first. According to some embodiments of the invention, the systems and methods download the system feeds on a daily basis, decide on a list on main views, analyze the feeds to calculate the product clusters and preparing output files for the vendors. According to some embodiments of the invention, the systems and methods have the advantages of: No overload—Instead of reading the whole book, a "table of content" window is presented on the left side that shows the major product groups. Apart from functionally it reduces the current visual load of the current loads on text in the current layout; The navigation is not linear! Clicking on a product groups will take the shopper to that group, no need to page down. Visual interface—no need for prior familiarity with intricate product categories—everything has a picture; thus, one click will select your desired product group and what you see is what you get. Pareto—The product groups are presented in descending order of importance, according to their relative "market share" which is the number of products in each group. Additional advantages are: User experience—improved user experience; Faster Navigation to the desired product that increases conversion rates and decreases the load on the system; and Positioning—position the system as using best of bread shopping technology.

Regarding color, according to some embodiments of the invention, the systems and methods uses an economic 19 natural color palette rather than using an artificial color palette, which may better cater to shoppers than an RGB palette. Not using natural colors creates another problem, though one color is chosen, other color appear. Separating product from its background, in many product photos, the product appears with a background. Context—the systems and methods are context sensitive, only the colors that appear in the offering are shown, and a number shows the number of deals which contain, the relevant color. This way shopper can see the color distribution of the relevant offering and focus on the existing colors. The systems and methods may work online or offline. Offline, they may analyze content items from providers in relation to their form, color and content and convert the results to a standardized file. Actual purchases may them be related or included in the files. Online, users may search the offers using queries that may be likewise analyzed.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method of presenting a plurality of visual content items, comprising:
   receiving a text query submitted by a user;
   grouping a plurality of visual content items which are provided as query results to said text query in a plurality of groups according to a plurality of predefined similarity rules relating to a plurality of visual characteristics of the plurality of visual content items;
   selecting a plurality of representative visual content items each for one group of the plurality of groups, each one of said plurality of representative visual content-items is selected according to at least one image parameter thereof, each one of said plurality of representative visual content items is selected from the plurality of visual content items of a respective said group;
   presenting a graphical user interface having:
     a first subpart presenting said plurality of representative visual content items each of one of the plurality of groups;
     a second subpart presenting a plurality of categorization items each indicative of a different color;
     a third subpart presenting members of one of the plurality of groups; and
   filtering at least some of said plurality of groups or at least some of said plurality of visual content items in said plurality of groups in response to at least one user selection of at least one of said categorization items in said second subpart;
   updating a presentation of said graphical user interface on a display of a user terminal in response to an outcome of said filtering;
   labeling each group of the plurality of groups with a group label selected from a plurality of text fields of members of the respective group; wherein the group label describes at least one non visual characteristic of the respective representative visual content item; wherein said presentation comprises presenting said group label;

wherein the plurality of visual content items are images of a plurality of products and the least one non visual characteristic in indicative of a member of a group consisting of; who made a product, when a product was made, where a product was made, a content of a product, a product usage instructions, and a safely of a product.

2. The computer implemented method of claim 1, further comprising presenting the plurality of visual content items alongside the representative visual content item.

3. The computer implemented method of claim 1, wherein at least one of said plurality of predefined similarity rules defines a fixed number of visual content items.

4. The computer implemented methods of claim 1, wherein the grouping is carried out by using predefined color groups indicated by said to at least one user selection.

5. The computer implemented methods of claim 1, wherein the grouping is carried out using predefined shape groups indicated by said to at least one user selection.

6. The computer implemented method of claim 1, wherein at least one of the groups comprises human faces.

7. The computer implemented method of claim 1, wherein at least one of the groups comprises product images.

8. The computer implemented method of claim 1, wherein at least one of the groups comprises landscape images.

9. The computer implemented method of claim 1, wherein the representative visual content item of each group are presented in descending order of their range for the number of its members.

10. The computer implemented method of claim 1, wherein the representative visual content item of each group are reduced images.

11. The computer implemented method of claim 1, wherein the representative visual content item of each group are thumbnails.

12. The computer implemented method of claim 1, wherein the representative visual content item are presented on a predefined sub part of a users' display.

13. The computer implemented method of claim 1, wherein the representative visual content item are presented on a separate window.

14. The computer implemented method of claim 1, wherein the grouping is carried out using at least one keypoint of the visual content items.

15. The computer implemented method of claim 1, wherein the visual content items are product offerings.

16. The computer implemented method of claim 1, wherein the visual content items are product offerings presented on an online market place.

17. The method of claim 1, wherein members other than the representative visual content item are presented in a descending order of similarity relative to the representative visual content item.

18. The method of claim 1, wherein the grouping is performed according to text similarity between text strings which are associated with different visual content items from the plurality of visual content items.

19. The method of claim 1, further comprising:
selecting a first group of the plurality of groups by a user which clicks on an area in the presentation;
presenting a plurality of members of the first group in response to the selecting.

20. The method of claim 1, wherein the plurality of visual content items are image files of a plurality of webpages.

21. The computer implemented method of claim 1, wherein said at least one image parameter is selected from a group consisting of resolution, symmetry, and background uniformity.

22. The computer implemented method of claim 1, wherein each of said plurality of categorization items is indicative of said different color and a shape category.

23. A data processing system for analyzing and presenting a plurality of visual content items, comprising:
a mediator computer server adapted to be connected via one communication link to a user client and another communication link to a plurality of sources holding the plurality of visual content items;
wherein said mediator computer server is adapted to:
receive a text query submitted by a user;
group the plurality of visual content items which are provided as query results to said text query in a plurality of groups according to a plurality of predefined similarity rules relating to a plurality of visual characteristics of the plurality of visual content items such that each group of the plurality of groups has a range for the number of its members,
select a plurality of representative visual content items each for one group of the plurality of groups, each one of said plurality of representative visual content items is selected according to at least one image parameter thereof, each one of said plurality of representative visual content items is selected from the plurality of visual content items of a respective said group;
present a graphical user interface having:
a first subpart presenting said plurality of representative visual content items;
a second subpart presenting a plurality of categorization items each indicative of a different color;
a third subpart presenting members of one of the plurality of groups; and
filter at least some of said plurality of groups or at least some of said plurality of visual content items in said plurality of groups in response to at least one user selection of at least one of said categorization items in said second subpart;
update a presentation of said graphical user interface on a display of a user terminal in response to an outcome of said filtering;
label each group of the plurality of groups with a group label selected from a plurality of text fields of members of the respective group; wherein the group label describes at least one non visual characteristic of the respective representative visual content item; wherein said presentation comprises presenting said group label;
wherein the plurality of visual content items are images of a plurality of products and the least one non visual characteristic in indicative of a member of a group consisting of; who made a product, when a product was made, where a product was made, a content of a product, a product usage instructions, and a safely of a product.

24. The data processing system of claim 23, wherein the graphical user interface is arranged to present the representative visual content items alongside the visual content items of the respective group.

25. The data processing system of claim 23, wherein for each group, members other than the representative visual content item are presented in a descending order of similarity relative to the representative visual content item.

\* \* \* \* \*